United States Patent
Omar (10) Patent No.: US 8,190,307 B2
(45) Date of Patent: *May 29, 2012

(54) CONTROL OPTIMIZATION METHOD FOR HELICOPTERS CARRYING SUSPENDED LOADS

(75) Inventor: Hanafy M. Omar, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 134 days.

This patent is subject to a terminal disclaimer.

(21) Appl. No.: 12/861,541

(22) Filed: Aug. 23, 2010

(65) Prior Publication Data

US 2012/0043414 A1   Feb. 23, 2012

(51) Int. Cl.
*G05D 1/00* (2006.01)
(52) U.S. Cl. .......... 701/4; 701/27; 701/40; 701/44; 701/57; 701/59; 701/3; 701/10; 701/60; 700/28; 700/29; 700/48; 700/50; 700/54; 706/2; 706/3; 706/4; 706/5; 706/6; 706/13; 706/903; 706/913; 244/17.11; 244/3.21; 244/26; 244/164; 244/171
(58) Field of Classification Search .......... 701/3, 4, 701/27, 40, 44, 46, 57, 58, 59, 60, 10, 98, 701/106; 700/28, 29, 48, 50, 54, 55; 244/17.11, 244/26, 3.21, 164, 171, 177, 184, 183, 191; 706/2, 3, 4, 5, 6, 13, 903, 905, 913
See application file for complete search history.

(56) References Cited

U.S. PATENT DOCUMENTS

| | | | |
|---|---|---|---|
| 4,741,501 A | 5/1988 | Clelford et al. | |
| 5,428,543 A | 6/1995 | Gold et al. | |
| 6,189,836 B1 * | 2/2001 | Gold et al. | 244/191 |
| 6,516,309 B1 | 2/2003 | Eberhart et al. | |
| 6,532,454 B1 * | 3/2003 | Werbos | 706/14 |
| 7,370,829 B2 * | 5/2008 | Badre-Alam et al. | 244/17.13 |
| 8,104,720 B2 * | 1/2012 | Hirvonen et al. | 244/194 |
| 2009/0033259 A1 * | 2/2009 | Cesario et al. | 318/400.04 |

* cited by examiner

*Primary Examiner* — Redhwan K Mawari
(74) *Attorney, Agent, or Firm* — Richard C. Litman (57) ABSTRACT

The control optimization method for helicopters carrying suspended loads during hover flight utilizes a controller based on time-delayed feedback of the load swing angles. The controller outputs include additional displacements, which are added to the helicopter trajectory in the longitudinal and lateral directions. This simple implementation requires only a small modification to the software of the helicopter position controller. Moreover, the implementation of this controller does not need rates of the swing angles. The parameters of the controllers are optimized using the method of particle swarms by minimizing an index that is a function of the history of the load swing. Simulation results show the effectiveness of the controller in suppressing the swing of the slung load while stabilizing the helicopter.

6 Claims, 9 Drawing Sheets

CONTROL OPTIMIZATION METHOD FOR HELICOPTERS CARRYING SUSPENDED LOADS

BACKGROUND OF THE INVENTION

1. Field of the Invention

The present invention relates to feedback control system optimization, and more specifically to a control optimization method for helicopters carrying suspended loads that provides an anti-swing feedback control system for the loads carried by the helicopter.

2. Description of the Related Art

Helicopters can be used in carrying heavy loads in civil, military, and rescue operations where the use of ground based equipment would be impractical or impossible. An unmanned small-scale helicopter can be used also in landmine detection application. The global landmine problem is indeed significant, with the United Nations estimating that there are more than 100 million mines in the ground and that 50 people are killed each day by mines worldwide. The idea is to suspend the mine detection equipment as a slung load underneath a low-cost model helicopter, which has the considerable advantage over a ground based vehicle that it needs no contact with the ground. Therefore, there is no risk of the mines being detonated in the detection process. In these applications, the external load behaves like a pendulum. If the pendulous motion of the load exceeds certain limits, it may damage the load or threaten the life of the rescued person. Moreover, the external load can change natural frequencies and mode shapes of the low frequency modes of the helicopter. In addition, the aerodynamics of the load may make it unstable in certain flight conditions. These problems slow or even prevent an accurate pickup or placement of the load. Moreover, it adds extra effort on the pilot.

The dynamics of a helicopter with external suspended loads received considerable attention in the late 1960's and early 1970's. Two reasons for this interest were the extensive external load operations in the Vietnam War, and the Heavy Lift Helicopter program (HLH). This interest has been renewed recently with the advances in modern control technologies. A lot of efforts were made for modeling the slung load and studying its effect on helicopter dynamics, however there are relatively few works that discussed control of a helicopter sling. Examples of automatic control for helicopters with slung loads include a single-cable dynamic model developed using a straightforward application of Lagrange equations, and an expanded version of this model, which includes two tandem cables. However, such a formulation was based on the Newton-Euler equations of motion for small perturbations separated into longitudinal and lateral sets. The disadvantage was that aerodynamic forces on the cables and the load were neglected, as were the helicopter rotor dynamic modes.

Other methods involved the computerized simulation of a helicopter and external load in real time with a pilot in the loop. Load aerodynamics was incorporated into the model, as well as rotor-downwash effects in hover.

Moreover, other developed control requirements for sling-load stabilization involved linearized equations of motion of the helicopter, winch, cable, and load for variable suspension geometry and were then used in conjunction with modern control theory resulting in a design of several control systems for each type of suspension.

Other researchers examined the feasibility of stabilizing external loads by means of controllable fins attached to the cargo. A major disadvantage was that in such a system, a simple linear model representing the yawing and the pendulous oscillations of the slung-load system assumes that the helicopter motion is unaffected by the load. Additionally, the use of active aerodynamic Load Stabilization Systems for a helicopter sling-load system has been investigated.

All the above studies are based on the classical control techniques. What is needed is a new anti-swing controller for a helicopter slung load system near hover flight. Such a controller should be based on time-delayed feedback of the load swing angles. The output from such a controller would be additional displacements that are added to the helicopter trajectory in the longitudinal and lateral directions. Hence, its implementation would be simple and need small modification to the software of a helicopter position controller. It would be desirable to determine parameters of the controllers using particle swarms optimization technique (PSO) by minimizing an index, which is a function of the history of load swing.

Particle swarm optimization is a population based stochastic optimization technique, which is inspired by social behavior of bird flocking, or fish schooling. PSO shares many similarities with evolutionary computation techniques such as Genetic Algorithms (GA. The system is initialized with a population of random solutions and searches for optima by updating generations. However, unlike GA, PSO has no evolution operators such as crossover and mutation. In PSO, the potential solutions, called particles, fly through the problem space by following the current optimum particles. Compared to GA, the advantages of PSO are that PSO is easy to implement and there are few parameters to adjust.

Moreover, PSO like all evolutionary algorithms optimizes a performance index based on input/output relationships only; therefore, minimal knowledge of the plant under investigation is required. In addition, because derivative information is not needed in the execution of the algorithm, many pitfalls that gradient search methods suffer from can be overcome.

Thus, a control optimization method for helicopters carrying suspended loads solving the aforementioned problems is desired.

SUMMARY OF THE INVENTION

The control optimization method for helicopters carrying suspended loads during hover flight utilizes a controller based on time-delayed feedback of the load swing angles. The controller outputs include additional displacements that are added to the helicopter trajectory in the longitudinal and lateral directions. This simple implementation requires only a small modification to the software of the helicopter position controller. Moreover, the implementation of this controller does not need rates of the swing angles. The parameters of the controllers are optimized using the method of particle swarms by minimizing an index that is a function of the history of the load swing. Simulation results show the effectiveness of the controller in suppressing the swing of the slung load while stabilizing the helicopter.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
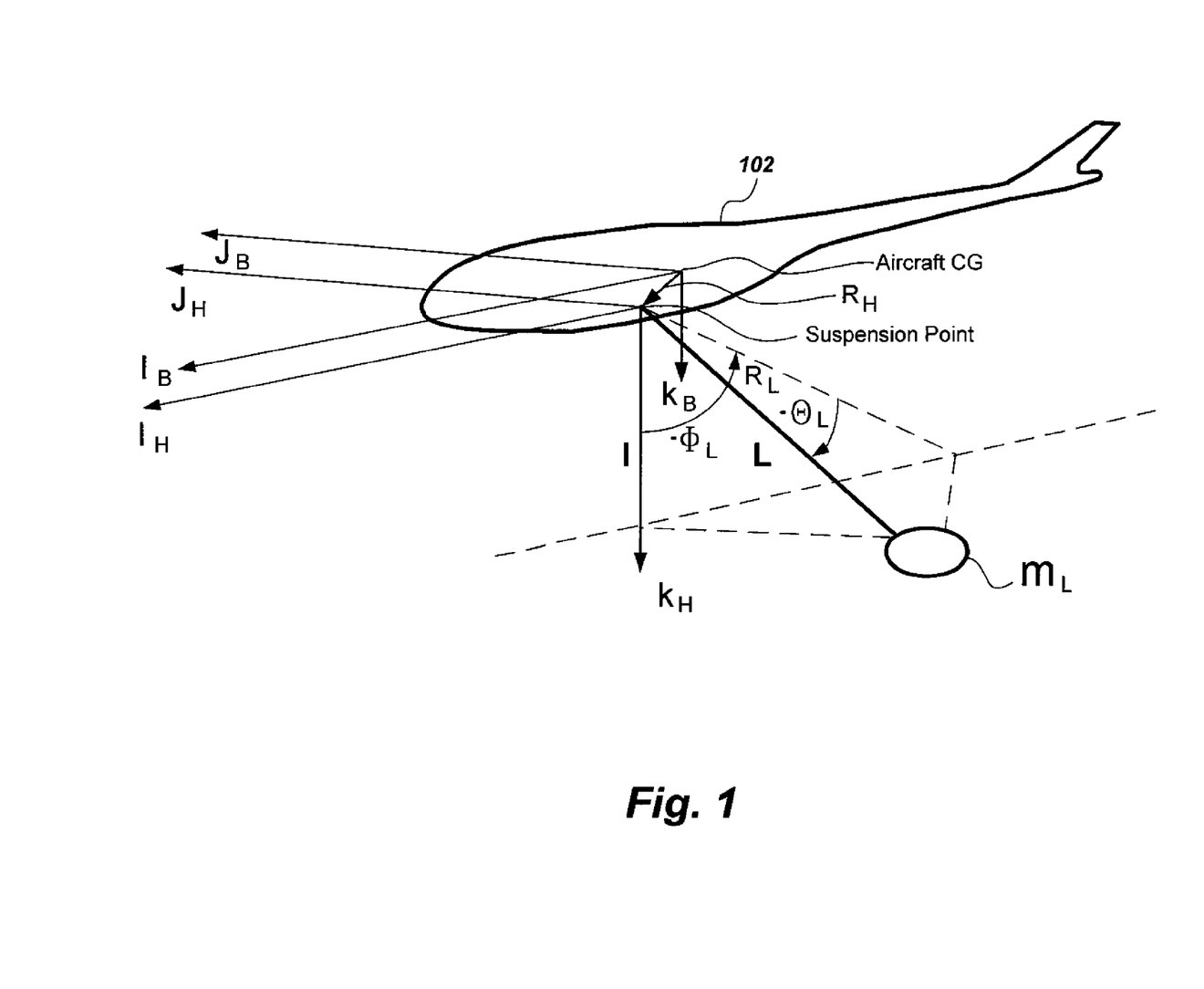
FIG. 1 is a diagram showing the configuration of a helicopter carrying a suspended load.
Figure 2:
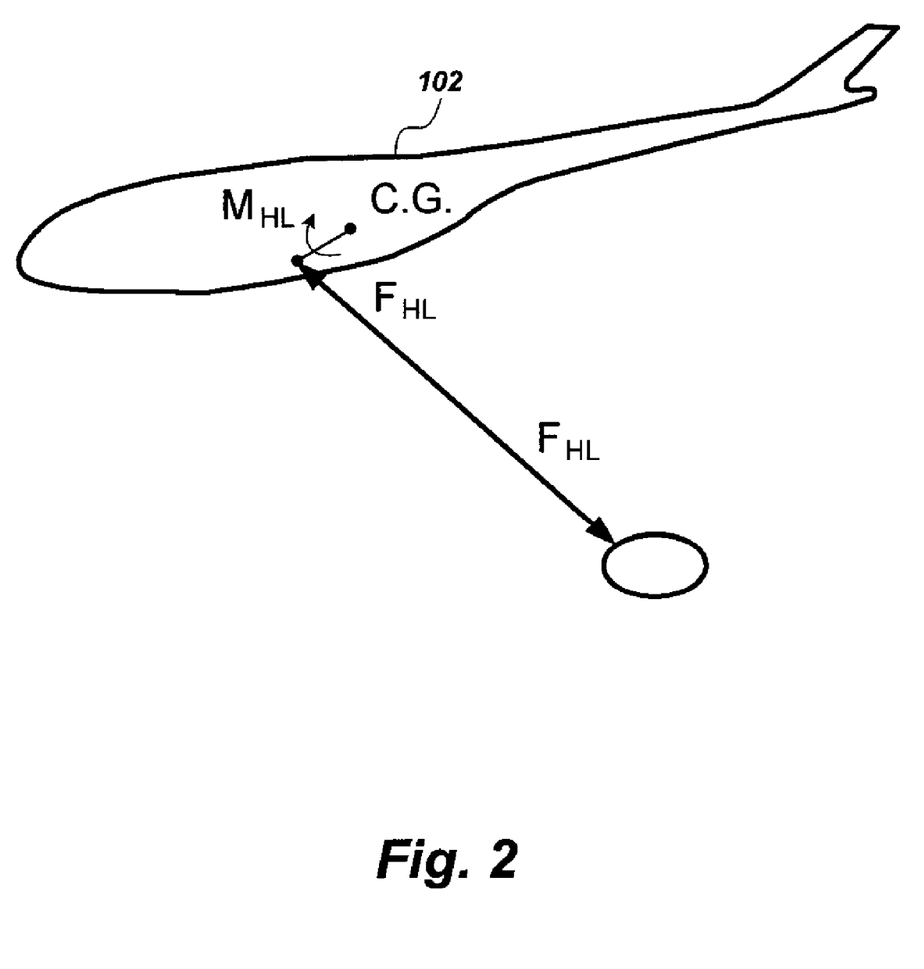
FIG. 2 is a diagram showing the load contribution to helicopter forces.
Figure 3:
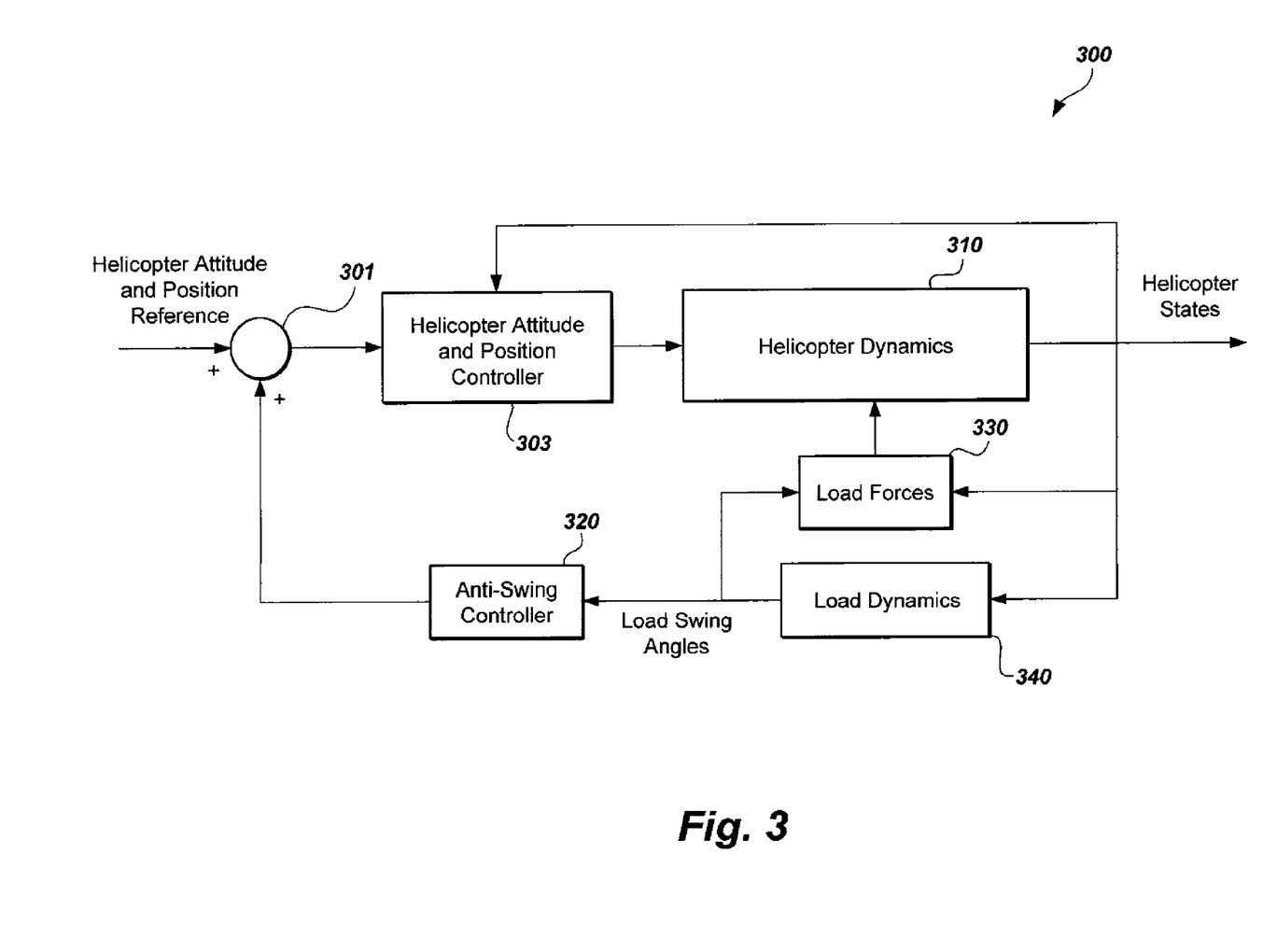
FIG. 3 is a block diagram showing a load swing control system used in a control optimization method for helicopters carrying a suspended load according to the present invention.

As shown in FIG. 3, the control optimization method for helicopters carrying a suspended load optimizes a tracking controller 303 and an anti-swing controller 320. As shown in FIGS. 1 and 2, the helicopter with a slung system can be considered as a multi-body dynamical system. The equations of motion of each body can be written alone and then modified by adding the interaction forces between them. At the outset, frequently used equation nomenclature is set forth below, as follows:

Nomenclature
$F_{HL}$=Force transferred from the load to the helicopter
$k_d$=gain of the delayed feedback controller
L=load cable length
$m_L$=load mass
$M_{HL}$=Moment transferred from the load to the helicopter
N=number of particles in PSO
PSO=particle swarm optimization algorithm
$R_H$=hook position vector
$R_L$=load position vector
p,q,r=helicopter angular velocities
$V_{max}$=maximum velocity of PSO particles
u,v,w=helicopter velocities
x,y,z=helicopter CG position
$\phi,\theta,\phi$=Euler angles
$\phi_L,\theta_L$=load swing angles
$\tau_d$=time delay
$\gamma_1,\gamma_2$=PSO learning factors The helicopter is modeled as a rigid body with six degrees of freedom. The twelve helicopter states include translational velocities (u,v,w), angular velocities (p,q,r), Euler angles ($\phi,\theta,\phi$) and helicopter position (x,y,z).

The external load is modeled as a point mass that behaves like a spherical pendulum suspended from a single point. The cable is assumed to be inelastic and with no mass. The geometry and the relevant coordinate systems are shown in FIG. 1. The unit vectors $i_H, j_H, k_H$ of the "hook" coordinate system always remain parallel to those of the body axis system of helicopter 102. The position of the load is described by the two angles $\phi_L$ and $\theta_L$, where $\phi_L$ is load angle in the xz plane where $\theta_L$ is the load oscillation angle out of the xz plane. Therefore, the position vector $R_L$ of the load with respect to the suspension point is given by:

$$R_L = L\cos(\theta_L)\sin(\phi_L)i_H + L\sin(\theta_L)j_H + L\cos(\theta_L)\cos(\phi_L)k_H \quad (1)$$

The position vector $R_H$ of the hook with respect to the helicopter center of gravity (c.g.) is given by:

$$R_H = x_H i_H + y_H j_H + z_H k_H \quad (2)$$

The absolute velocity $V_L$ of the load is given by:

$$V_L = V_{cg} + \dot{R} + \Omega \times R \quad (3)$$

where $V_{cg}$ is the absolute velocity of the center of mass of the helicopter, $R = R_L + R_H$ is the position vector of the load with respect to the center of mass of the helicopter, and $\Omega = pi_H + qj_H + rk_H$ is the angular velocity of the helicopter. The absolute acceleration $a_L$, of the load is:

$$a_L = \dot{V}_L + \Omega \times V_L \quad (4)$$

The unit vector in the direction of the gravity force is given by:

$$K_g = -\sin(\theta)i_H + \sin(\phi)\cos(\theta)j_H + \cos(\phi)\cos(\theta)k_H \quad (5)$$

Beside the gravity, there is an aerodynamic force applied on the point mass load. Since the analysis in this work will be restricted to the helicopter motion near hover, the aerodynamics loads on the load will be neglected.

The equations of motion of the load are written by enforcing moment equilibrium about the suspension point, that is, in matrix form:

$$R_L \times (-m_L a_L + m_L g k_g) = 0 \quad (6)$$

The above equation gives three scalar equations of second order, only the equations in the x and y directions are retained, which represent the equations of motion of the load.

The suspended load introduces additional terms in the rigid body force and moment equations of motion of the helicopter, namely load forces 330 and load dynamics 340, as shown in FIG. 3. The force and moment loads, $F_{HL}$ and $M_{HL}$ are shown in FIG. 2. The force that the load exerts on the helicopter is given by:

$$F_{HL} = -m_L a_L + m_L g k_g \quad (7)$$

The additional moment $M_{HL}$ is therefore given by:

$$M_{HL} = R_H \times F_{HL} \quad (8)$$

The above equations give highly nonlinear expressions. These equations cannot be used for stability analysis. Therefore, they must be linearized around the trim condition. To be able to perform the linearization process, the trim values of the helicopter and the load must be determined.

The obtained equations are nonlinear and complicated. For the design purpose, these equations are linearized about the hovering conditions. Near hover, the forward speed is nearly zero (i.e., $u_0$=0). Assuming that the helicopter roll angle is also zero even with the effect of the load on the helicopter (i.e., $\phi_0$=0) simplifies the analysis. At this condition, the load trim equations give the following trim values.

$$\theta_{Lo} = 0, \phi_{Lo} = 0 \quad (9)$$

Imposing above results to the linearized load equations obtains the following equations of motion for the load, $$g\theta_L - g\cos(\theta_o)\phi + y_h \dot{q} + \dot{V} + L\dot{\theta}_L = 0 \quad (10)$$

$$L\ddot{\phi}_L + g\phi_L + g\theta + (x_h - L\sin(\theta_o))\cos(\theta_o)\dot{p} + z_h \sin(\theta_o)\dot{r} + L\cos[\theta_o]\sin[\theta_o]\dot{r} + \cos[\theta_o]\dot{U} + \sin[\theta_o]\dot{W} = 0 \quad (11)$$

The forces exerted by the load on the helicopter are;

$$F_x = m_L(-g\cos[\theta_o]\theta - x_h\dot{p} + L\sin[\theta_o]\dot{p} - \dot{U}[t] - L\cos[\theta_o]\dot{\phi}_L)$$

$$F_y = m_L(g\cos[\theta_o]\phi - y_h\dot{q} - \dot{V} - L\dot{\theta}_L)$$

$$F_z = m_L(-g\sin[\theta_o]\theta - (z_h + L\cos[\theta_o])\dot{r} - \dot{W} - L\sin[\theta_o]\dot{\phi}_L) \quad (12)$$

The moments in the x-y-z directions are;

$$M_x = m_L \begin{pmatrix} -gy_h\sin[\theta_o]\theta - gz_h\cos(\theta_o)\phi + y_hz_h\dot{q} - \\ y_h(\dot{z}_h + Ly_h\cos[\theta_o]\dot{r} + z_h\dot{V} - y_h\dot{W} + \\ Lz_h\ddot{\theta} - Ly_h\sin[\theta_o]\ddot{\phi}_L \end{pmatrix} \quad (13)$$

$$M_y = m_L \begin{pmatrix} -gz_h\cos[\theta_o]\theta + gx_h\sin[\theta_o]m_L\theta - x_hz_hm_L\dot{p} + \\ Lz_h\sin[\theta_o]\dot{p} + x_hz_h\dot{r} + Lx_h\cos[\theta_o]\dot{r} - z_h\dot{U} + \\ x_h\dot{W} - Lz_h\cos[\theta_o]\ddot{\phi}_L + Lx_h\sin[\theta_o]\ddot{\phi}_L \end{pmatrix}$$

$$M_z = m_L \begin{pmatrix} gy_h\cos[\theta_o]\theta + gx_h\cos[\theta_o]\phi + x_hy_h\dot{p} - \\ Ly_h\sin[\theta_o]\dot{p} - x_hy_h\dot{q} + y_h\dot{U} - x_h\dot{V} - \\ Lx_h\ddot{\theta}_L + Ly_h\cos[\theta_o]\ddot{\phi}_L \end{pmatrix}$$

These equations are linear and can be formulated in a state space form. If the load state vector is defined as $x_L = [\dot{\phi}_L \ \dot{\theta}_L \ \phi_L \ \theta_L]^T$, the load equations in state space can be written as $$E_L\dot{x} = A_L x \quad (14)$$

where x is the state vector for the load and the helicopter (i.e., $x = [x_H \ x_L]$).

Similarly, the effect of the load on the helicopter force terms can be written also as $$\begin{bmatrix} F_{HL} \\ M_{HL} \end{bmatrix} = E_{HL}\dot{x} + A_{HL}x \quad (15)$$

The linearized equations of motion of the helicopter and the load can be written in the following state space forms;

$$\dot{x} = \begin{bmatrix} \dot{x}_h \\ \dot{x}_L \end{bmatrix} = Ax + B\eta \quad (16)$$

Referring to the control system diagram 300 of FIG. 3, the tracking controller 303 for the helicopter 102 is designed to follow the trajectory generated by the anti swing controller 320. Therefore, the controller design of the whole system can be divided into two stages. In the first stage, the tracking controller 303 for the helicopter 102 alone is designed by neglecting the effect of the slung load suspended by distance L on the helicopter dynamics 310. The function of the tracking controller 303 is to stabilize the helicopter 102 and follow the trajectory generated by the anti-swing controller 320. In the second stage, the whole system is integrated by augmenting of the dynamics of the controlled helicopter with the dynamics of the slung load. Then the proposed time delayed anti-swing controller (DASC) is added to the integrated system and the performance of the whole system is evaluated. The optimal parameters of the anti-swing controller are determined based on minimizing the history of the load swing.

To design the tracking controller, it is assumed that the reference trajectory for the helicopter states is $x_{ref}$, then the error signal is $e = x_{Href} - x_H$. Using state feedback technique, the helicopter control input can be written as;

$$\eta = K(x_{Href} - x_H) \quad (17)$$

The feedback gain matrix K is chosen such that the error history is minimum. The feedback gain (K) can be determined using the linear quadratic regulator technique (LQR), which depends on minimizing a quadratic function that can be written as;

$$Indx = \int_0^{t_f} (e^T Q e + \eta^T R \eta) dt \quad (18)$$

Since, the goal to minimize the error signal, Q is chosen with high gains compared to R. After determining K, the helicopter state space model can be rewritten as, $$\dot{x}_H = (A_H - B_H K)x_H + B_H K x_{Href} = A_c x_H + B_c x_{Href} \quad (19)$$

The above equation indicates that the reference states become the new inputs for the helicopter.

In the second stage, the anti-swing controller is designed. After modifying the helicopter dynamics by incorporating the stability and tracking controller, the effect of the load swing forces are added to the helicopter state space model. Before this step, Eq. (19) needs to be expressed in terms of the total state vector, which includes the helicopter and the load states. In this case, the helicopter dynamics can be written as:

$$\dot{x}_H = [A_c \ 0] \begin{bmatrix} \dot{x}_H \\ \dot{x}_L \end{bmatrix} + [B_c \ 0] \begin{bmatrix} x_{Href} \\ 0 \end{bmatrix} \quad (20)$$
$$= A_1 x + B_1 x_{ref}$$

The slung load effect modifies the forces and moments equations in the helicopter equations of motion. Recalling Eq. (15), the forces and moments from the slung load can be written as, $$\begin{bmatrix} F_{HL} \\ M_{HL} \end{bmatrix} = E_{HL}\dot{x} + A_{HL}x \quad (21)$$

Adding these forces to the helicopter dynamics, the new model can be written as:

$$\begin{bmatrix} I & 0 \\ 0 & 0 \end{bmatrix} \begin{bmatrix} \dot{x}_h \\ \dot{x}_l \end{bmatrix} = \quad (22)$$

$$\left( \begin{bmatrix} A_1 \\ [0]_{4\times 16} \end{bmatrix} + \begin{bmatrix} [0]_{3\times 16} \\ A_{HL} \\ [0]_{7\times 16} \end{bmatrix} \right) x + \begin{bmatrix} [0]_{3\times 16} \\ E_{HL} \\ [0]_{7\times 16} \end{bmatrix} \dot{x} + \begin{bmatrix} B_1 \\ [0]_{4\times 12} \end{bmatrix} x_{ref}$$

$$E_H \dot{x} = A_2 x + E_2 \dot{x} + B_2 x_{ref}$$

The load dynamics can be written as:

$$E_L \dot{x} = A_L x \quad (23)$$

By adding the previous two equations together, the final state space model for the combined systems (Helicopter and the slung load) is obtained:

$$(I - E_2 + E_L)\dot{x} = (A_2 + A_L)x + B_2 x_{ref}$$

$$\dot{x} = (I - E_2 + E_L)^{-1}(A_2 + A_L)x + (I - E_2 + E_L)^{-2} B_2 x_{ref}$$

$$\dot{x} = A_f x + B_f x_{ref} \quad (24)$$

The anti-swing controller for the in-plane and out-of-plane motions can be expressed as follows:

$$x_s = k_{dx} L \phi_L(t-\tau_{dx})$$

$$y_s = k_{dy} L \theta_L(t-\tau_{dy}) \quad (25)$$

where $x_s$ and $y_s$ are additional displacement that are added to the helicopter trajectory in the longitudinal and lateral direction respectively. k is the feedback gain and $\tau$ is the time delay introduced in the feedback of the load swing angles. These parameters are chosen to maximize the damping of the slung load system by minimizing the following index, which is expressed in terms of the time history of the load swing;

$$ISH = \int_0^{tf} (\theta_L^2 + \dot{\theta}_L^2 + \phi_L^2 + \dot{\phi}_L^2) dt \quad (26)$$

PSO simulates the behaviors of bird flocking. Suppose the following scenario: a group of birds are randomly searching food in an area. There is only one piece of food in the area being searched. All the birds do not know where the food is. But they know how far the food is in each iteration. So what's the best strategy to find the food? The effective one is to follow the bird, which is nearest to the food.

PSO learns from the scenario and uses it to solve the optimization problems. In PSO, each single solution is a bird, i.e., particle in the search space. All of particles have fitness values, which are evaluated by the fitness, function to be optimized, and have velocities, which direct the flying of the particles. The particles fly through the problem space by following the current optimum particles.

PSO is initialized with a group of random particles (solutions) and then searches for optima by updating generations. In every iteration, each particle is updated by following two best values. The best values represent the lowest values for the objective function since our problem is a minimization problem. For each particle, Pbest is the best solution (fitness) achieved so far during the iteration. Another best value that is tracked by the particle swarm optimizer is the best value obtained so far by any particle in the population, which is, by definition, a global best, i.e., gbest. After finding these two best values, the particle updates its velocity and positions with following two equations as;

$$v_i(k+1) = v_i(k) + \gamma_1(P_{best} - x_{pi}(k)) + \gamma_2(G_{best} - x_{pi}(k)) \quad (27)$$

$$x_{pi}(k+1) = x_{pi}(k) + v_i(k+1) \quad (28)$$

where v is the particle velocity and $x_p$ is the current particle position (solution). The pseudo code of the procedure is as follows:

```
//Randomly initialize N particles
Do
  For each particle
    Calculate fitness value (i.e. objective function)
    If the fitness value is better than the best fitness
    value (pBest) in history, set current value as the new
    pBest
  end
End
Choose the particle with the best fitness value of all
the particles as the gRest
For each particle
  Calculate particle velocity according equation (27)
  Update particle position according equation (28)
End
```

While maximum iterations or minimum error criteria is not attained.//

The exemplary Chinook helicopter was chosen since the aerodynamics derivatives near hover is available in the literature. Without loss of generality, the following data for numerical simulation is assumed. The tracking controller equation is:

$$K = 10^3 I, Q = I \quad (29)$$

The load equation is:

$$L = 15 \text{ ft}, x_h = y_h = z_h = 0 \quad (30)$$

Figure 4:
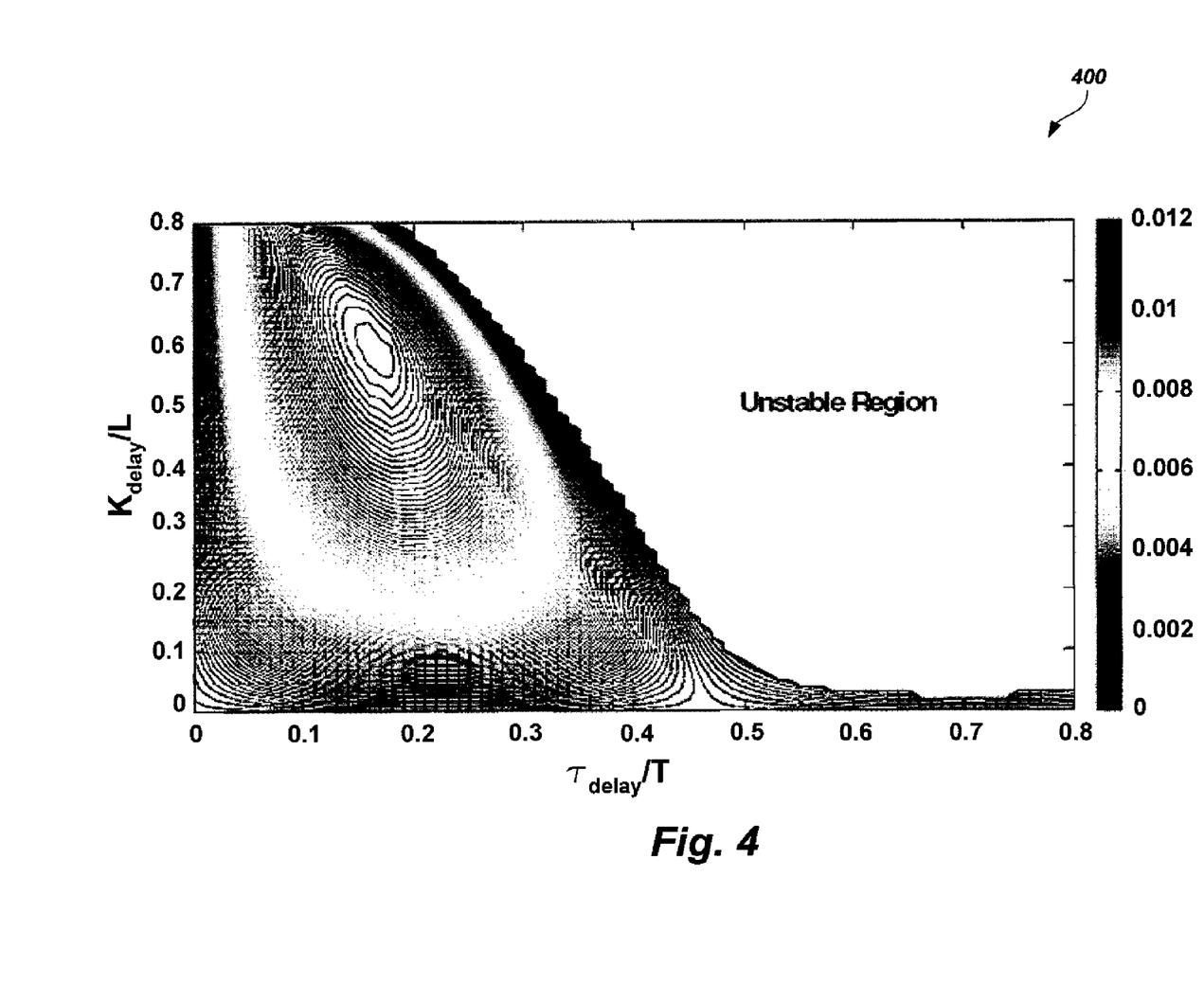
FIG. 4 is a plot showing the damping map of the load swing using DASC.

To choose the control parameters of the anti-swing controller, $k_{dx} = k_{dy}$ and $\tau_{dx} = \tau_{dy}$ is assumed to thereby obtain a map that represents the relationship between the damping of the load swing and the parameters of the anti-swing controller. To get this map, it is assumed that the load swing is 20 degrees for the load swing angles and the remaining states for the helicopter and the load are zeros. The reciprocal of the swing index ISH is used as an indication of the level of damping as shown in damping map plot 400 of FIG. 4. This map shows also the ranges of the control parameters that stabilize the system. The highest level of damping can be achieved at the following values, $$k_d = k_{dx} = k_{dy} = 0.67L, \tau = \tau_{dx} = \tau_{dy} = 0.19 T_L \quad (31)$$

where $$T_L = \frac{2\pi}{\sqrt{g/L}}$$

is the period of oscillation of the suspended load.

To get the optimal values of the four parameters that minimize the swing index ISH, the particle swarm method is used. The following values are used for the PSO code:

$$N = 30, V_{max} = 2, \gamma_1 = \gamma_2 = 1 \quad (32)$$

Figure 5:
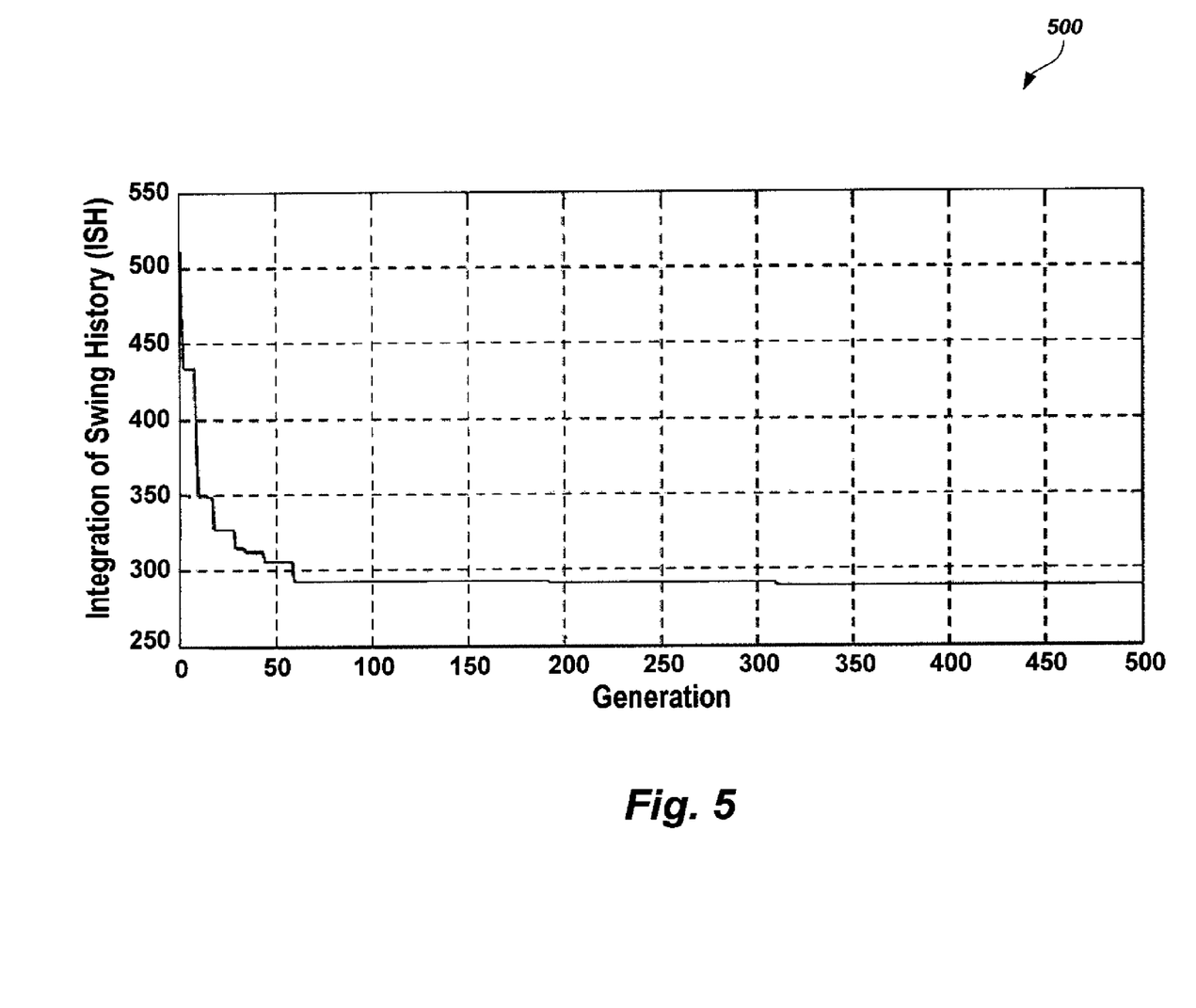
FIG. 5 is a plot showing the evolution of the PSO code in a control optimization method for helicopters carrying a suspended load according to the present invention.

The evolution of the swing index (1/ISH) at each iteration is shown in plot 500 of FIG. 5. The optimal parameters obtained using this technique were found to be:

$$k_{dx} = 0.658L, \tau_{dx} = 0.188 T_L, k_{dy} = 0.824L, \tau_{dy} = 0.175 T_L \quad (33)$$

The minimum value for ISH corresponding to these parameters is found to be 288, while it was 294 when the same gains for the longitudinal and lateral motions were used. This result is expected, since this case allows for more freedom than the case when only two parameters are available.

Figure 6:
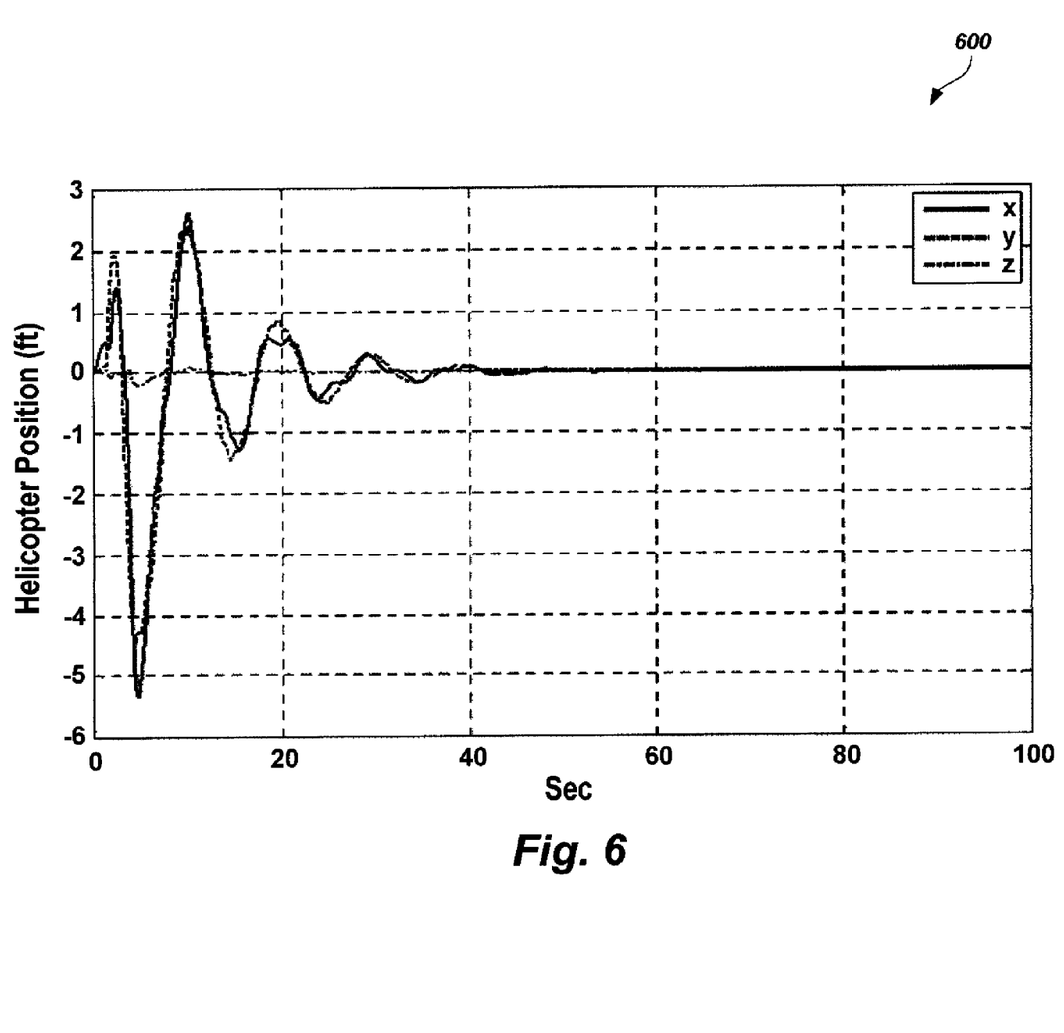
FIG. 6 is a plot showing the time history of the helicopter CG using DASC with optimal gains.
Figure 7:
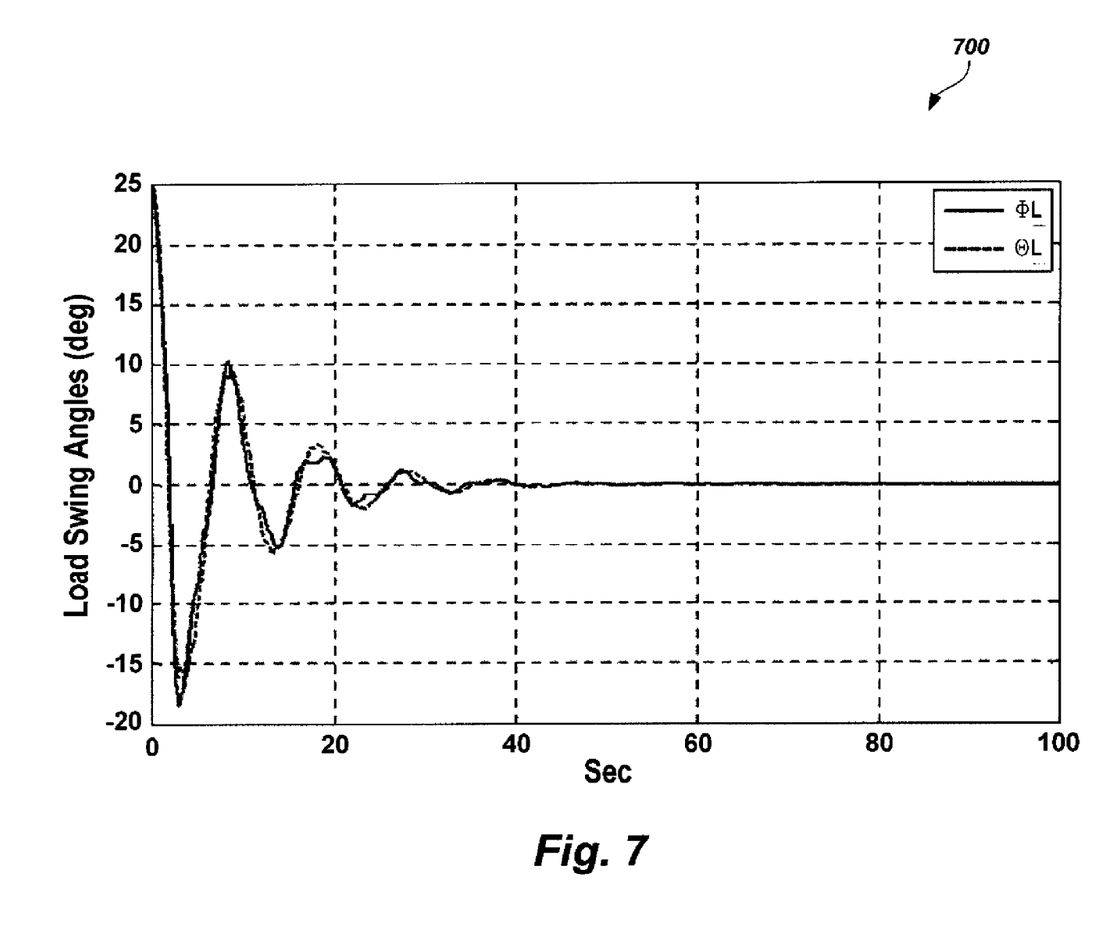
FIG. 7 is a plot showing the time history of the load swing angles using DASC with optimal gains.
Figure 8:
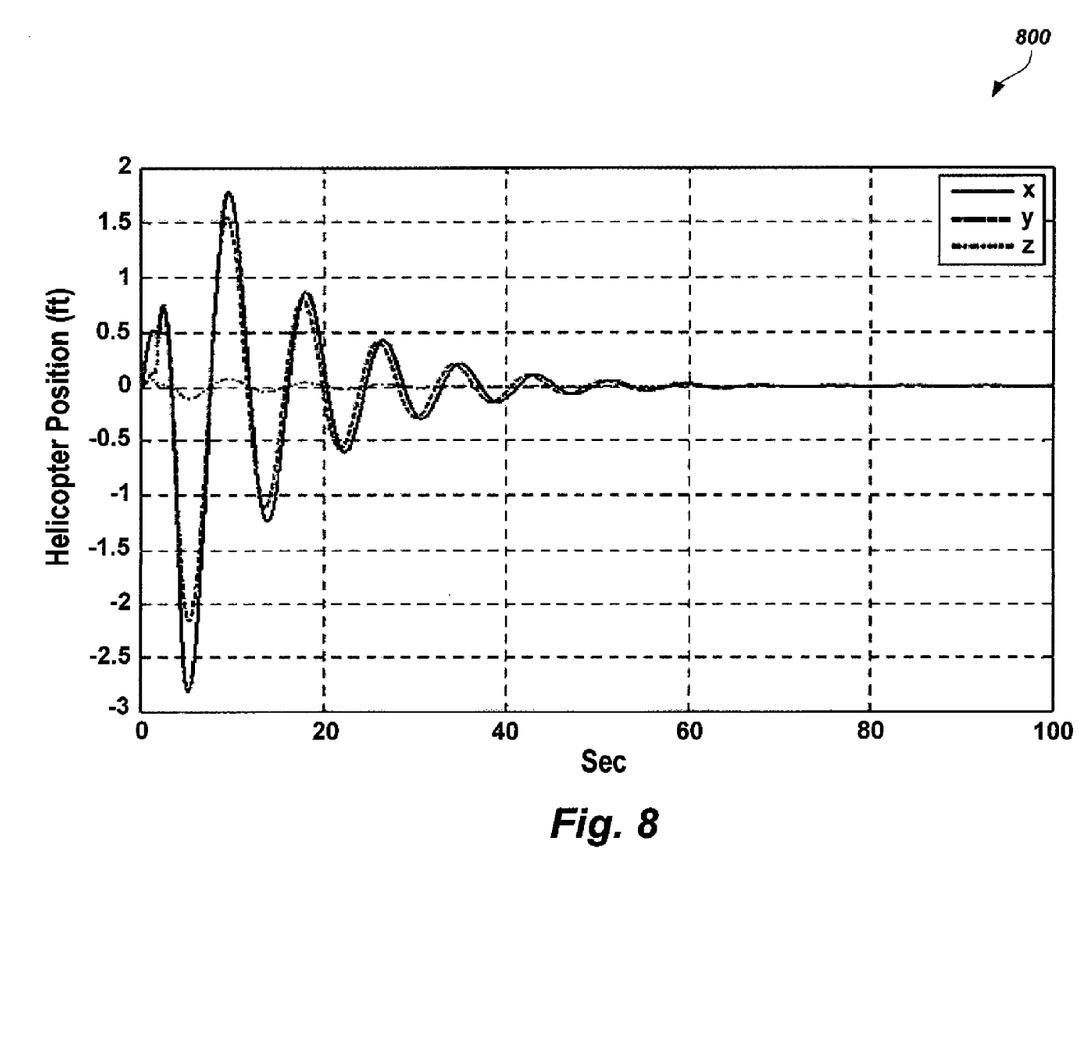
FIG. 8 is a time history of the helicopter CG using DASC with $K_d$=0.3 and $\tau$=0.2
Figure 9:
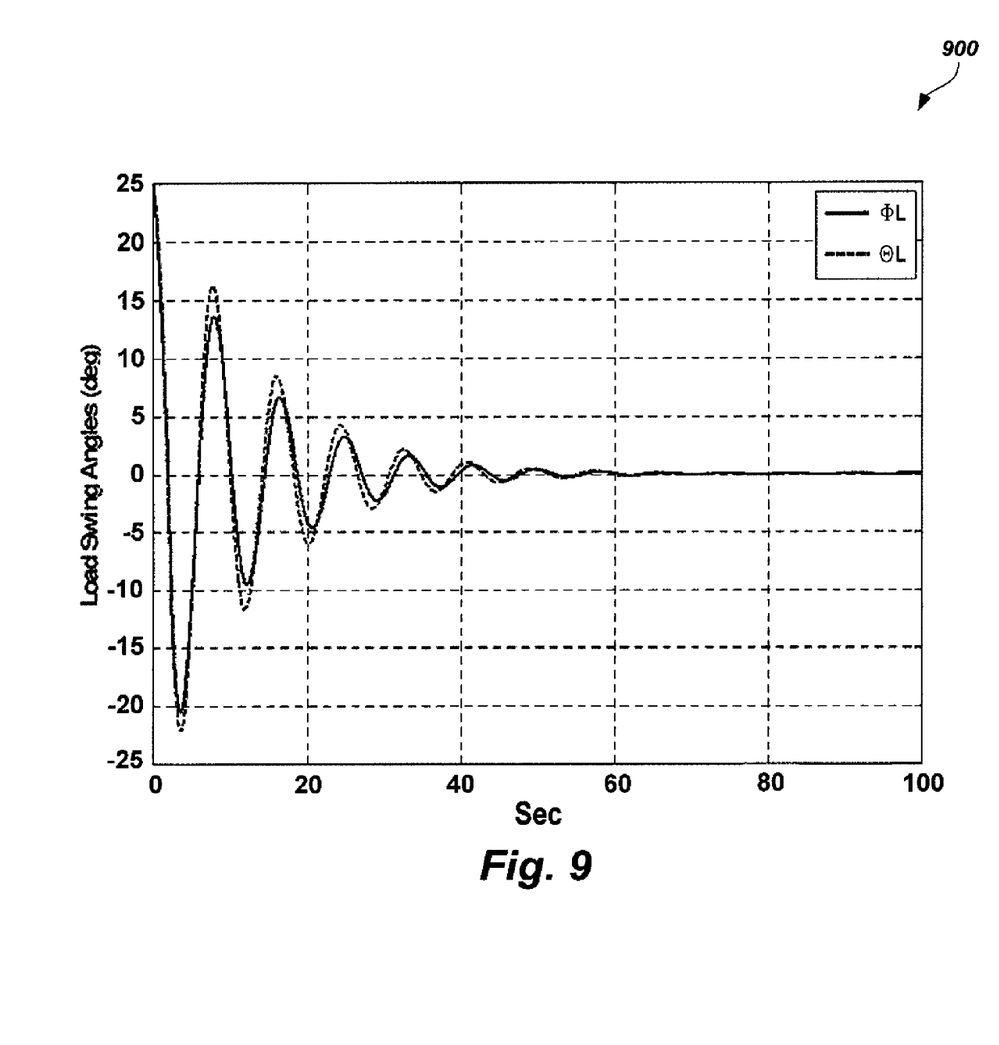
FIG. 9 is a plot showing time history of the load swing angles using DASC with $K_d$=0.3 and $\tau_d$=0.2 $T_L$.

The time history of the helicopter CG and the load swing angles are shown in FIGS. 6 and 7 using the optimal gains obtained from PSO. Plots 600 and 700 of FIGS. 6-7 show the effectiveness of the proposed controller in suppressing the load swing. The anti-swing controller perturbs the helicopter from its initial position, but it returns it back due to the stability of the whole system. The maximum deviation in helicopter position is nearly 5 ft, which can be considered small. But, this value can be decreased more by choosing small values of the anti-swing gain ($k_d$) without significant decrease in the level of swing damping. The damping map can help in choosing the value of this gain. As shown in the map, with $K_d = 0.3$ and $\tau = 0.2$, a high level of damping that is comparable to the one obtained using the optimal gains but with small value for the traveling distance of the helicopter is achieved. The value of ISH recorded in this case is 420.

It can be shown also by simulations that the designed system is robust with the changes of the load mass, shown in Table 1, and the changes in the position of the load suspension point, shown in Table 2. Moreover, its control parameters are functions of the load cable length.

TABLE 1

Performance of DASC with variation of load weight

| | $m_r$ | | | |
|---|---|---|---|---|
| | 0.3 | 0.5 | 0.7 | 0.9 |
| ISH | 339 | 288 | 251 | 221 |

TABLE 2

Performance of DASC with location of the suspension point

| | location | | | |
|---|---|---|---|---|
| | $x_h = 2, y_h = 0,$ $z_h = 1$ | $x_h = 2, y_h = 0,$ $z_h = 1$ | $x_h = 2, y_h = 0,$ $z_h = 1$ | $x_h = 2, y_h = 0,$ $z_h = 1$ |
| ISH | 267 | 272 | 320 | 316 |

A new anti-swing controller that is based on time-delayed feedback of the load swing angles for helicopter slung load system near hover flight has been described herein. Via simulations, a simplified mathematical model for the helicopter and the slung load is derived using the Newtonian approach. In this model, the load is treated as a point mass with single point suspension point while the helicopter is treated as a rigid body. The derived equations are highly nonlinear and coupled. For design purposes these equations are linearized around the hovering condition.

To implement the anti-swing controllers, an LQR designed tracking controller for the helicopter is provided. The function of the tracking controller is to stabilize the helicopter and track the trajectory generated by the anti-swing controller.

A map that represents the level of damping achieved by DASC is constructed as a function of the DASC parameters. To consider the coupling between the in-plane and out-of-plane load swing, the particle swarm optimization algorithm (PSO) is used to get the optimal gains for controlling the swing of both motions. The simulation results show the effectiveness of DASC in suppressing the load swing. For initial disturbance of the load swing angles, the anti-swing controller makes the helicopter slightly move from its rest position to damp the swing motion then it returns the helicopter back to its nominal position due to the stability of the whole system and the damping added to the load swing by DASC. The parameters of DASC can be chosen to keep the helicopter deviation from hovering position within acceptable limits.

It will be understood that the diagrams in the Figures depicting the control optimization technique are exemplary only, and may be embodied in a dedicated electronic device having a microprocessor, microcontroller, digital signal processor, application specific integrated circuit, field programmable gate array, any combination of the aforementioned devices, or other device that combines the functionality of the control optimization technique onto a single chip or multiple chips programmed to carry out the method steps described herein, or may be embodied in a general purpose computer having the appropriate peripherals attached thereto and software stored on a computer readable media that can be loaded into main memory and executed by a processing unit to carry out the functionality of the apparatus and steps of the method described herein.

It is to be understood that the present invention is not limited to the embodiment described above, but encompasses any and all embodiments within the scope of the following claims.

I claim:

1. A control optimization method for a helicopter carrying a suspended load while in hover flight, the method comprising the steps of:

designing a helicopter attitude and position tracking controller, the helicopter attitude and position tracking controller generating outputs for stabilizing the helicopter while accepting tracking commands from a reference source and displacement commands from a feedback source as inputs, the design including feedback gain (k) based on minimizing a load swing history, wherein the load swing history is represented by a Linear Quadratic Regulator method, the Linear Quadratic Regulator method depending on minimizing the quadratic function:

$$Indx = \int_0^{t_f} (e^T Q e + \eta^T R \eta) dt$$

wherein indx represents the feedback gain matrix integral over time tf, wherein $\eta^\tau$ and $\eta$ represent helicopter control inputs, wherein $.e^\tau$ represents an error signal, wherein Qe represents an angular velocity of a helicopter, and wherein R is a position vector of the load with respect to a center of mass of the helicopter;

determining helicopter dynamics, suspended load forces and suspended load dynamics, the suspended load dynamics including load swing angles;

designing an anti-swing controller, the anti-swing controller issuing the displacement commands to the helicopter attitude and position tracking controller, the displacement commands being based on time-delayed feedback of the load swing angles represented by the equations:

$$X_s = k_{dx} L \phi_L (t - \tau_{dx})$$

$$y_s = k_{dy} L \phi_L (t - \tau_{dy})$$

where $x_s$ and $y_s$ are additional displacement added to the helicopter trajectory in a longitudinal and lateral direction, wherein $\phi L$ is the load angle in a xz plane and $\theta L$ is the load angle out of a xz plane, respectively, k is a feedback gain, L is a load cable length, and $\tau$ is a time delay introduced in the feedback of the load swing angles;

optimally selecting values for the k, and $\tau$ parameters by minimizing a swing index function ISH expressed in terms of a time history integral from zero to tf of the load swing angles in the longitudinal $\phi L$, and lateral $\theta L$ directions, the index function being represented by the equation:

$$ISH = \int_0^{t_f} (\theta_L^2 + \dot{\theta}_L^2 + \phi_L^2 + \dot{\phi}_L^2) dt,$$

the index function minimizing being performed using an evolutionary computation algorithm, wherein said evolutionary computation algorithm is a particle swarm optimization algorithm;

iteratively calculating a fitness value using the particles, wherein said fitness value is used to provide a global minimum of said index function; and implementing an optimized anti-swing controller in a feedback control loop with the tracking controller to achieve suspended load swing reduction of the suspended load and stability control of the helicopter.

2. The control optimization method for a helicopter according to claim 1, further comprising the step of generating a damping map of stable and unstable regions of the load swing, said particle swarm optimization algorithm being operable to find optimum gains and time delays over the stable region of the load swing damping map.

3. The control optimization method for a helicopter according to claim 1, further comprising the step of using approximately thirty particles, a maximum particle velocity of approximately two, and a learning factor of approximately one in said particle swarm optimization algorithm.

4. A computer software product, comprising a non-transitory storage medium readable by a processor, the medium having stored thereon a set of instructions for establishing optimized control parameters for a helicopter carrying a suspended load while in hover flight, the set of instructions including:

(a) a first sequence of instructions which, when executed by the processor, causes said processor to configure a helicopter attitude and position tracking controller, the helicopter attitude and position tracking controller being designed to generate outputs for stabilizing the helicopter while accepting tracking commands from a reference source and displacement commands from a feedback source as inputs, the design configuration including feedback gain k based on minimizing a load swing history, wherein the load swing history is represented by a Linear Quadratic Regulator method, the Linear Quadratic Regulator method depending on minimizing the quadratic function, $$Indx = \int_0^{t_f} (e^T Q e + \eta^T R \eta) dt$$

wherein Indx represents the feedback gain matrix integral over time tf, wherein $\eta^\tau$ and $\eta$ represent helicopter control inputs, wherein $.e^\tau$ represents an error signal, wherein Qe represents an angular velocity of a helicopter, and wherein R is a position vector of the load with respect to a center of mass of the helicopter;

(b) a second sequence of instructions which, when executed by the processor, causes said processor to determine helicopter dynamics, suspended load forces and suspended load dynamics, the suspended load dynamics including load swing angles;

(c) a third sequence of instructions which, when executed by the processor, causes said processor to configure an anti-swing controller, the anti-swing controller issuing the displacement commands to the helicopter attitude and position tracking controller, the displacement commands being based on time-delayed feedback of the load swing angles represented by the equation:

$$x^s = k_{dx} L \phi L(t - \tau_{dx})$$

$$y_s = k_{dy} L \theta L(t - \tau_{dy})$$

where $x_s$, and $y_s$ are additional displacement added to the helicopter trajectory in a longitudinal and lateral direction, wherein $\phi L$ is the load angle in a xz plane and $\theta L$, is the load angle out of a xz plan, respectively, k is a feedback gain, L is a load cable length and $\tau$ is a time delay introduced in the feedback of the load swing angles;

(d) a fourth sequence of instructions which, when executed by the processor, causes said processor to optimally select values for the k and $\tau$ parameters by minimizing a swing index function ISH expressed in terms of a time history integral from zero to tf of the load swing angles in the longitudinal $\phi L$ and lateral $\theta L$., directions of the load swing angles, the index function being represented by the equation:

$$ISH = \int_0^{t_f} (\theta_L^2 + \dot{\theta}_L^2 + \phi_L^2 + \dot{\phi}_L^2) dt,$$

the index function minimizing being performed using an evolutionary computation algorithm, wherein said evolutionary computation algorithm is a particle swarm optimization algorithm;

(e) a fifth sequence of instructions which, when executed by the processor, causes said processor to iteratively calculate a fitness value using the particles, wherein said fitness value is used to provide a global minimum of said index function; and (f) a sixth sequence of instructions which, when executed by the processor, causes said processor to implement an optimized anti-swing controller in a feedback control loop with the tracking controller to achieve suspended load swing reduction of the suspended load and stability control of the helicopter.

5. The computer software product according to claim 4, wherein the set of instruction further comprises a seventh sequence of instructions which, when executed by the processor, causes said processor to generate a damping map of stable and unstable regions of said load swing, said particle swarm optimization algorithm being operable to find optimum gains and time delays over said stable region of said load swing damping map.

6. The computer software product according to claim 4, wherein the set of instruction further comprises an eighth sequence of instructions which, when executed by the processor, causes said processor to use approximately thirty particles, a maximum particle velocity of approximately two, and a learning factor of approximately one in said particle swarm optimization algorithm.

* * * * *